(12) United States Patent
Chun et al.

(10) Patent No.: US 11,643,981 B2
(45) Date of Patent: May 9, 2023

(54) SYSTEM AND METHOD FOR CONTROLLING FUEL FLOW TO AN AIRCRAFT ENGINE DURING START

(71) Applicant: PRATT & WHITNEY CANADA CORP., Longueuil (CA)

(72) Inventors: Michael Chun, Vaughn (CA); Shahin Shokatpour Torab, Richmond Hill (CA); Simon John Hartropp, Sainte-Adèle (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/461,557

(22) Filed: Aug. 30, 2021

(65) Prior Publication Data
US 2023/0069668 A1 Mar. 2, 2023

(51) Int. Cl.
*F02C 9/46* (2006.01)
*F02C 7/32* (2006.01)
*F02C 9/28* (2006.01)

(52) U.S. Cl.
CPC ............ *F02C 9/46* (2013.01); *F02C 7/32* (2013.01); *F02C 9/28* (2013.01);
(Continued)

(58) Field of Classification Search
CPC ...... F02C 9/26; F02C 9/28; F02C 9/46; F02C 7/26; F02C 7/32; F05D 2270/092;
(Continued)

(56) References Cited

U.S. PATENT DOCUMENTS

| 4,344,141 A | * | 8/1982 | Yates | F02C 9/28 |
| | | | | 701/123 |
| 4,490,791 A | * | 12/1984 | Morrison | F02C 9/28 |
| | | | | 340/965 |

(Continued)

FOREIGN PATENT DOCUMENTS

| WO | 9307373 | 4/1993 |
| WO | 03018977 | 3/2003 |

OTHER PUBLICATIONS

D. Andreadis, "Altitude Ignition/Lean Decel Study," AFWAL-TR-85-2054, Nov. 1985. (Year: 1985).*

(Continued)

*Primary Examiner* — Todd E Manahan
*Assistant Examiner* — David P. Olynick
(74) *Attorney, Agent, or Firm* — Norton Rose Fulbright Canada LLP (57) ABSTRACT

A method and system for controlling fuel flow to an aircraft engine during start are provided. Following light-off, an actual value of at least one engine operating parameter is obtained. Based on a difference between the actual value and a target value, a first command is generated to cause fuel flow to be provided to the engine's combustor according to a computed fuel flow rate defined by a fuel schedule of the engine. When the computed fuel flow rate is within a fuel flow rate limit, the first command is output. Otherwise, a limiting factor is applied to the computed fuel flow rate to limit a reduction in fuel flow to the combustor and a limited fuel flow rate is obtained, and a second command is output to cause fuel flow to be provided to the combustor according to the limited fuel flow rate.

20 Claims, 6 Drawing Sheets

(52) U.S. Cl.
CPC .... *F05D 2220/323* (2013.01); *F05D 2220/50* (2013.01); *F05D 2260/85* (2013.01); *F05D 2270/092* (2013.01); *F05D 2270/306* (2013.01); *F05D 2270/31* (2013.01)

(58) Field of Classification Search
CPC ......... F05D 2270/304; F05D 2270/306; F05D 2270/3061; F05D 2270/309; F05D 2270/31; F05D 2220/323; F05D 2220/50; F05D 2260/85
See application file for complete search history.

(56) References Cited

U.S. PATENT DOCUMENTS

| | | | | |
|---|---|---|---|---|
| 5,694,760 | A * | 12/1997 | Baxter | F02C 9/28 60/773 |
| 6,516,263 | B1 * | 2/2003 | Keller | F02C 9/28 701/100 |
| 8,151,573 | B2 | 4/2012 | Christopher et al. | |
| 2005/0262825 | A1 * | 12/2005 | Certain | F02C 9/28 60/39.281 |
| 2006/0254282 | A1 * | 11/2006 | Riley | F02C 7/26 60/773 |
| 2007/0113563 | A1 * | 5/2007 | Mulera | F01D 19/00 60/779 |
| 2011/0302927 | A1 * | 12/2011 | Ajami | F02C 7/26 60/776 |
| 2012/0174594 | A1 | 7/2012 | Winston et al. | |
| 2020/0149479 | A1 | 5/2020 | Des Roches-Dionne et al. | |
| 2020/0158027 | A1 | 5/2020 | Wang | |

OTHER PUBLICATIONS

Spang, et al., "Control of jet engines," Control Engineering Practice 7 (1999) 1043}1059. (Year: 1999).*

Ravi Kiran Bompelly, "Lean Blowout and Its Robust Sensing in Swirl Combustors," School of Aerospace Engineering Georgia Institute of Technology May 2013 (Year: 2013).*

Fuel Flow mass flow rate, https://www.grc.nasa.gov/www/k-12/airplane/fuelfl.html, downloaded Jul. 8, 2022. (Year: 2022).*

* cited by examiner

SYSTEM AND METHOD FOR CONTROLLING FUEL FLOW TO AN AIRCRAFT ENGINE DURING START

TECHNICAL FIELD

The application relates generally to aircraft engines and, more particularly, to controlling fuel flow to an aircraft engine during start.

BACKGROUND OF THE ART

An engine flameout refers to unintended shutdown of an engine due to the extinction of flames in the combustion chamber. In some cases, the reduction in fuel flow to the engine's combustor following light-off may be responsible for an engine flameout. While several approaches may be used to avoid engine flameout, there remains room for improvement.

SUMMARY

In one aspect, there is provided a method for controlling fuel flow to an aircraft engine during start. The method comprises following a light-off of the aircraft engine, obtaining an actual value of at least one operating parameter of the aircraft engine, computing a difference between the actual value of the at least one operating parameter and a target value of the at least one operational parameter, generating, based on the difference, a first command to cause fuel flow to be provided to a combustor of the aircraft engine according to a computed fuel flow rate, the computed fuel flow rate defined by a fuel schedule of the aircraft engine, comparing the computed fuel flow rate to a fuel flow rate limit. When the computed fuel flow rate exceeds the fuel flow rate limit, the method comprises determining a limiting factor to be applied to the computed fuel flow rate to limit a reduction in fuel flow to the combustor following the light-off of the aircraft engine, applying the limiting factor to the computed fuel flow rate to obtain a limited fuel flow rate, the limited fuel flow rate lower than the computed fuel flow rate, and outputting a second command to cause fuel flow to be provided to the combustor according to the limited fuel flow rate. When the computed fuel flow rate is within the fuel flow rate limit, the method comprises outputting the first command.

In another aspect, there is provided a system for controlling fuel flow to an aircraft engine during start. The system comprises at least one processing unit and at least one non-transitory computer-readable memory having stored thereon program instructions executable by the at least one processing unit for, following a light-off of the aircraft engine, obtaining an actual value of at least one operating parameter of the aircraft engine, computing a difference between the actual value of the at least one operating parameter and a target value of the at least one operational parameter, generating, based on the difference, a first command to cause fuel flow to be provided to a combustor of the aircraft engine according to a computed fuel flow rate, the computed fuel flow rate defined by a fuel schedule of the aircraft engine, comparing the computed fuel flow rate to a fuel flow rate limit, when the computed fuel flow rate exceeds the fuel flow rate limit, determining a limiting factor to be applied to the computed fuel flow rate to limit a reduction in fuel flow to the combustor following the light-off of the aircraft engine, applying the limiting factor to the computed fuel flow rate to obtain a limited fuel flow rate, the limited fuel flow rate lower than the computed fuel flow rate, and outputting a second command to cause fuel flow to be provided to the combustor according to the limited fuel flow rate, and when the computed fuel flow rate is within the fuel flow rate limit, outputting the first command.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
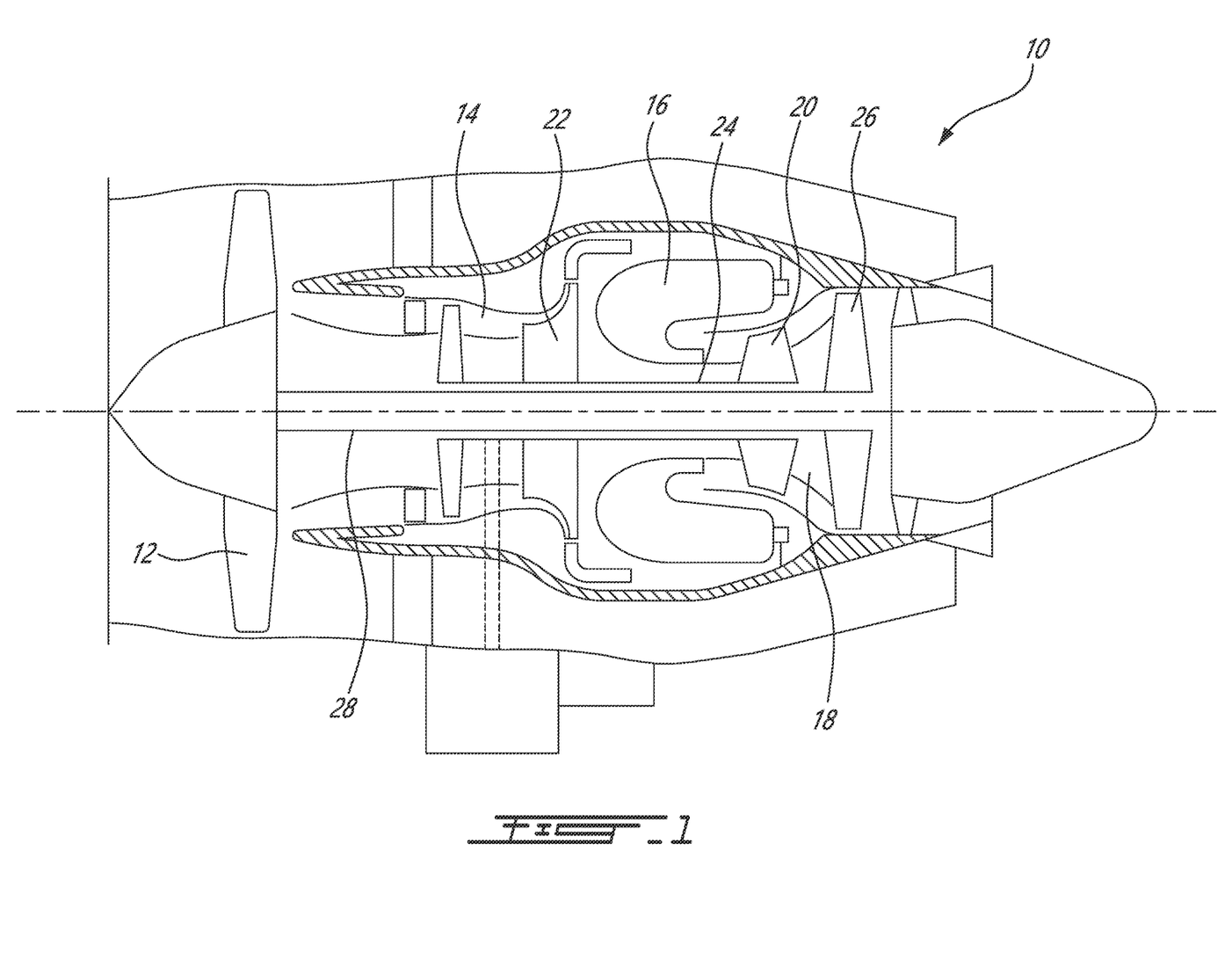
FIG. 1 is a schematic cross sectional view of a gas turbine engine, in accordance with an illustrative embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, the engine 10 may be an auxiliary power unit (APU), an auxiliary power supply (APS), a hybrid engine, or any other suitable type of engine. The APU may be provided for various purposes, including, but not limited to, the provision of electrical power and pneumatic air to an aircraft. The pneumatic air provided by the APU may be used on larger aircraft to provide auxiliary bleed air for starting the aircraft's main engines. In addition, while the engine 10 is shown as being a gas turbine for an aircraft, it should be noted that the embodiments described herein can apply to any suitable gas turbine engine, including primary engines, auxiliary engines, or to any engine of any suitable vehicle, generator, and the like. Thus, although the engine 10 is described herein for flight applications, it should be understood that other uses, such as industrial or the like, may apply.

Figure 2A:
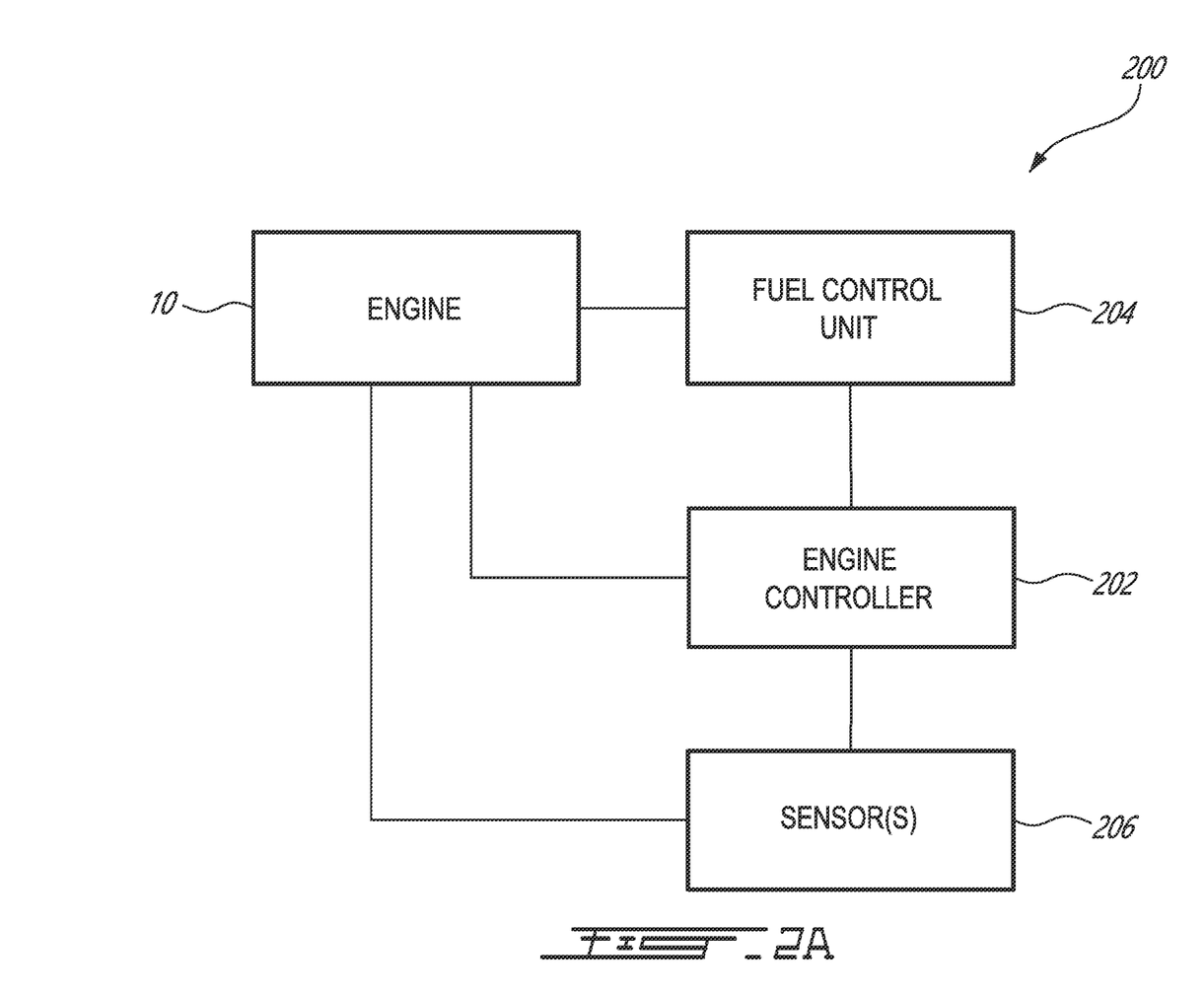
FIG. 2A is a block diagram of a system for controlling fuel flow to the engine of FIG. 1 during start, in accordance with an illustrative embodiment.

Referring now to FIG. 2A in addition to FIG. 1, a system 200 for controlling fuel flow to an aircraft engine (such as the engine 10) during start will now be described, in accordance with one embodiment. The system 200 comprises an engine controller 202, which is in communication with the engine 10 and is configured to control the operation and performance thereof. As described herein above, although systems and methods are described herein with reference to an APU, other engines may apply. In addition, the various components of system 200 may be implemented, separately or jointly, in any form or forms suitable for use in implementing the systems and methods disclosed herein.

The starting sequence (or start-up process) of the gas turbine engine 10 illustratively comprises two consecutive phases. In the first phase, the high pressure rotor(s) 22 of the compressor section 14 are rotated by a torque provided by an external source, such as a starter (not shown), in order to provide air flow into the combustor 16. Once a predetermined compressor pressure or speed has been reached, fuel flow is injected into the combustor 16 at a controlled rate. The engine controller 202 can control the fuel supply to the engine 10 by outputting one or more control signals (also referred to herein as fuel commands) to a fuel control unit 204 operatively coupled to the engine 10. The fuel control unit 204 is typically an electromechanical fuel metering valve disposed between a fuel source (not shown) and the combustor 16 for supplying fuel to the combustor 16 in response to the control signal(s) from the engine controller 202. In one embodiment, the fuel control unit 204 comprises a fuel pump and a stepper (not shown), a torque motor valve (not shown), or any suitable equivalent means for injecting fuel into the combustor 16. Upon receipt of the control signal(s), the fuel control unit 204 causes the injection of fuel into the combustor 16 of the engine 10. In particular and as will be discussed further below, the engine controller 202 is configured to modulate a fuel flow rate provided to the engine 10 during start.

The engine controller 202 selects the appropriate fuel schedule for the light-off procedure by querying a memory storing one or more fuel schedules. The memory may also store therein all data (e.g., engine operating parameters) sensed or measured (e.g., using sensor(s) 206 coupled to the engine 10) as well as other predetermined data and programs. In one embodiment, the fuel schedule, which is selected in the first phase of the engine starting process, follows an open loop fuel flow profile in which fuel flow is commanded based on a desired rotational speed of the compressor section 14. The fuel schedule may thus be referred to herein as an "open loop fuel schedule" and the first phase may be referred to as direct fuel flow control.

The fuel flow is injected to mix with the air flow and the mixture is then exposed to an ignition source (e.g., a spark igniter, not shown). Light-off of the combustion process occurs in the combustor 16 when an appropriate fuel/air ratio is reached, resulting in ignition of the engine 10. In one embodiment, the light-off occurrence is detected by monitoring (e.g., using sensor(s) 206) an exhaust temperature of the engine 10, with light-off being detected when the exhaust gas temperature, or temperature rise (or the rate of temperature rise) reaches a threshold (e.g., 200° F. temperature rise). In one embodiment, the inter-stage turbine temperature (ITT), which is the temperature of the exhaust gases between the high and low pressure turbines of the engine 10, is used as the exhaust temperature and may be monitored (e.g., using sensor(s) 206). The exhaust temperature may be monitored using a temperature sensor (not shown) associated with an exhaust outlet (not shown) of the engine 10. In another embodiment, an ultraviolet or photoelectric signal, which may be generated by any suitable flame detection measurement system and indicates the presence of visible flames at the exhaust outlet of the engine 10, may be monitored by the engine controller 202 to detect light-off. In another embodiment, light-off can be detected following a predetermined increase in the inter-stage turbine temperature. In yet another embodiment, light-off is detected when the gas generator (i.e. engine) speed (e.g., measured using sensor(s) 206) reaches a predetermined value. Other embodiments may apply.

In the second phase of the starting process (i.e. following light-off), fuel flow is continuously injected into the combustor 16, thus enabling local ignition to propagate and spread so as to form stable combustion in the combustor 16. The speed of the engine 10 is then accelerated until the engine 10 operates under a self-sustained speed. In particular, the fuel flow is injected according to a fuel schedule required for operation of the engine 10 from light-off to a self-sustaining condition. The appropriate fuel schedule is selected by the engine controller 202. In one embodiment, in the second phase, the fuel schedule follows a closed loop fuel profile in which fuel flow is commanded to achieve a desired acceleration of the compressor section 14. The fuel schedule may thus be referred to herein as a "closed loop fuel schedule" and the second phase may be referred to as sub-idle acceleration governing or closed loop sub-idle acceleration scheduling.

As will be discussed further below with reference to FIG. 2B, the engine controller 202 controls fuel flow to the combustor 16 during start of the engine 10 in order to prevent (or eliminate) an engine flameout condition. In particular, it is proposed herein to limit the reduction in fuel flow to the engine 10 during start by applying a limit (referred to herein as a "limiting factor") to a fuel flow rate (referred to herein as a "scheduled" or "computed" fuel flow rate) originally defined by the engine's preprogrammed closed loop fuel control logic. It should be understood that the engine start may occur in-flight (i.e. when the aircraft the engine 10 is provided on is airborne) or on the ground, such that the limiting factor may be applied in-flight or on the ground. As used herein, the term "computed" (or "scheduled") fuel flow rate refers to the fuel flow rate dynamically determined using the engine's closed loop control logic, based on a difference (also referred to herein as "error" or "controller error") between an actual value (e.g., as obtained from the measurement(s) acquired by the sensor(s) 206) and a target value (also referred to as a "reference value") of at least one operating parameter (e.g., acceleration) of the engine 10. As will be discussed further below, it is proposed herein to compare the computed fuel flow rate to a predetermined fuel flow rate limit and to apply the limiting factor to the computed fuel flow rate when the computed fuel flow rate exceeds the fuel flow rate limit. In one embodiment (as described and illustrated herein), the fuel flow rate limiting functionality may be implemented in software installed in the engine controller 202, i.e. in a device separate from the fuel control unit 204. In other embodiments (not shown), the fuel flow rate limiting functionality may be implemented in software integral to the fuel control unit 204.

As used herein, the term "flameout" refers to the rundown (or sudden drop of exhaust gas temperature) of the engine 10 that may be caused by the extinction of the flame in chamber(s) of the combustor 16. During engine flameout, the combustor 16 does not burn all of the fuel supplied to it, which in turn reduces the overall engine performance and efficiency. When flameout only occurs in some, but not all, (i.e. a subset of) chambers of the combustor 16, it is referred to as "partial flameout". For engines having a single combustion chamber, partial flameout is observed when flameout occurs in a section of the chamber. When flameout occurs in all chambers of the combustor 16, it is referred to as "complete flameout" or "full flameout". As used herein, the term "flameout condition" refers to an operating condition of the engine 10 that, if not corrected, results in flameout. Flameout may be caused by high velocity air entering the engine 10. Flameout may also be caused by improper fuel-air mixture or interruption of the airflow through the engine 10. This may be the result of a given engine operating condition, such as acceleration of the engine 10 increasing above a predetermined threshold. Flameout may further occur during the transition in fuel schedules throughout the start sequence, from the initial light-off phase to the initial acceleration phase of the engine 10. Indeed, fuel flow to the combustor 16 is typically reduced during this transition in order to avoid undesirable conditions, including, but not limited to, excessive engine temperature and compressor surge, which may result from excessive fuel flow. However, if the fuel flow reduction occurs too rapidly, this may result in low flame stability margins or even in the extinction of the flame in chamber(s) of the combustor 16 (i.e. flameout) if the fuel flow is reduced below a given threshold. In one embodiment, the systems and methods proposed herein may protect the engine 10 from rapid decreases in fuel flow, which could reduce flame stability margin at a critical time during the engine start sequence.

Figure 2B:
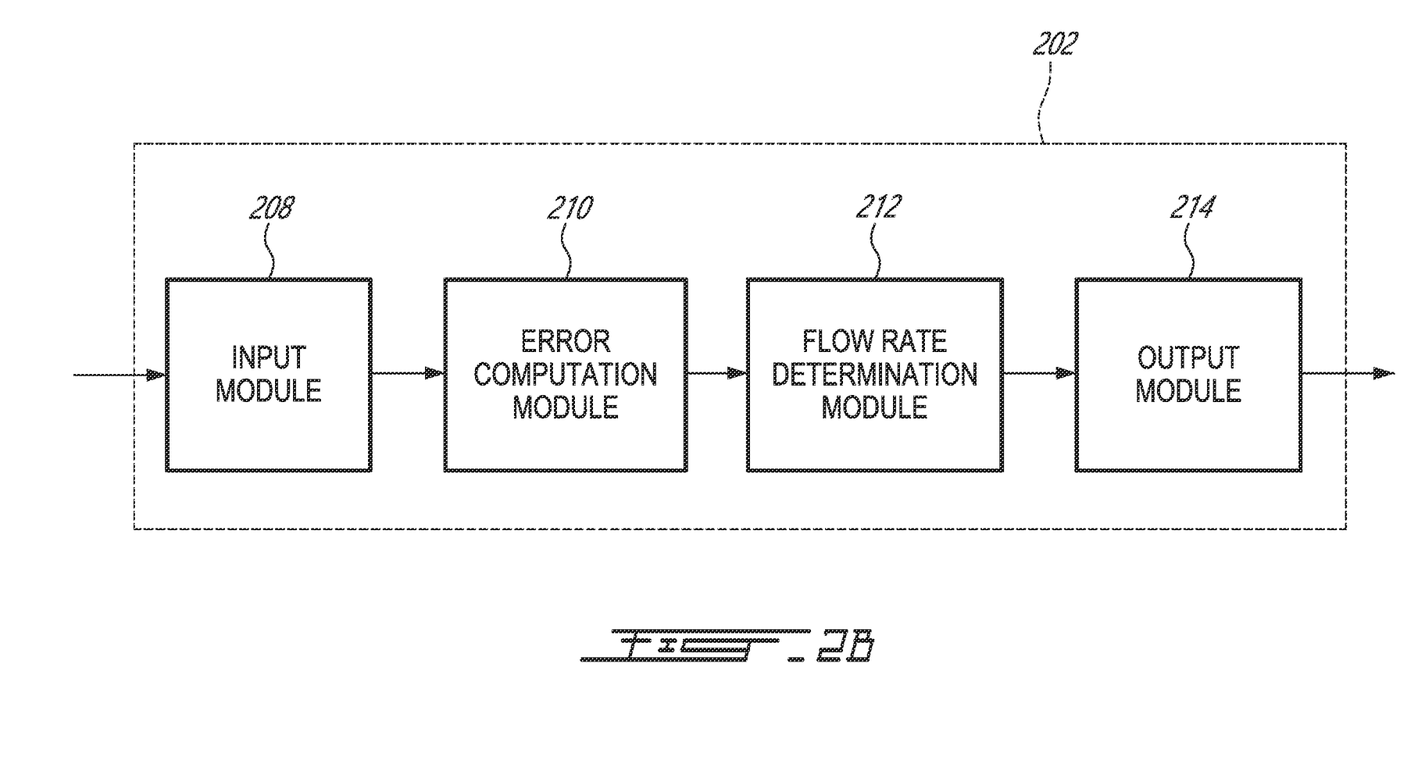
FIG. 2B is a block diagram of the engine controller of FIG. 2A, in accordance with an illustrative embodiment.

Referring now to FIG. 2B in addition to FIG. 2A, the engine controller 202 illustratively comprises an input module 208, an error determination module 210, a flow rate determination module 212, and an output module 214. The input module 208 is configured to obtain input data from (i.e. measurement(s) acquired by) the sensor(s) 206. In particular, following light-off of the engine 10, the input module 208 obtains an actual value of one or more operating parameters of the engine 10 that are monitored using the sensor(s) 206. In one embodiment, the engine controller 202 selects the fuel schedule appropriate for the engine 10 based on an acceleration error (i.e. on a difference between an actual acceleration and a target acceleration for the engine 10). As such, the input module 208 receives an actual value of an acceleration of the engine 10, as measured by the sensor(s) 206, and selects the fuel schedule to maintain the acceleration error within set limits. It should however be understood that the controller 202 may select the fuel schedule based on any suitable starting condition of the engine 10, and/or on operating conditions during flight. The input data received from the input module 208 may therefore comprise measurements indicative of operating parameter(s) other than the engine's acceleration. For example, measurement(s) indicative of, but not limited to, at least one of shaft speed, exhaust gas temperature (EGT), fuel flow, oil temperature, air inlet temperature, air inlet pressure, ambient temperature, ambient pressure, pressure altitude may be received. In addition, in some embodiments, the rate of change of one or more of these operating parameter(s) may be computed and used to determine the computed fuel flow rate.

The input module 208 sends the actual value of the engine's operating parameter(s) (e.g., acceleration) to the error determination module 210, which retrieves a target value of the engine's operating parameter(s) (e.g., acceleration) from a memory, database, or other suitable storage means. The error determination module 210 then computes a difference (also referred to herein as an "error") between the actual value and the target value of the engine's operating parameter(s). The difference is then sent to the flow rate determination module 212, which determines and controls the fuel flow rate according to which fuel is provided to the combustor 16. Based on the difference, the flow rate determination module 212 first generates a fuel command (referred to herein as a "first command") according to the engine's closed loop fuel control logic. More specifically, the flow rate determination module 212 generates the first command to cause fuel to be provided to the combustor 16 (i.e. to cause a reduction in fuel flow to the combustor 16) according to the computed fuel flow rate in order to mitigate the difference computed by the error determination module 210. To ensure that such a fuel flow reduction is not excessive (i.e. remains within acceptable limits), the flow rate determination module 212 compares the computed fuel flow rate to a predetermined fuel flow rate limit. In one embodiment, the fuel flow rate limit is a function of ambient conditions (e.g., altitude) and may be retrieved from memory (or other suitable storage means). The target value of the engine's operating parameter and the fuel flow rate limit may vary based on engine configuration and may be determined during engine design.

When the outcome of the comparison between the computed fuel flow rate and the fuel flow rate limit indicates that the computed fuel flow rate is within (i.e. below or equal to) the fuel flow rate limit, the fuel flow rate determination module 212 determines that fuel is to be provided to the combustor 16 according to the computed fuel flow rate defined by the closed loop fuel control logic. The fuel flow rate determination module 212 therefore outputs the first fuel command (also referred to herein as an "original fuel command") comprising instructions to cause fuel to be provided to the combustor 16 according to the computed fuel flow rate.

When the outcome of the comparison between the computed fuel flow rate and the fuel flow rate limit indicates that the computed fuel flow rate exceeds (i.e. is above) the fuel flow rate limit, the fuel flow rate determination module 212 determines that, in order to prevent engine flameout, fuel is to be provided to the combustor 16 according to a lower fuel flow rate (referred to herein as a "limited fuel flow rate") than the computed fuel flow rate. The fuel flow rate determination module 212 therefore modifies the original fuel command to generate a limited fuel command. More specifically, the fuel flow rate determination module 212 determines a limiting factor to be applied to the computed fuel flow rate in order to prevent the fuel flow to the combustor 16 from being reduced below a minimum fuel flow limit defined by the closed loop fuel schedule. The fuel flow rate determination module 212 applies the limiting factor to the computed fuel flow rate to obtain the limited fuel flow rate. As previously noted, the fuel flow to the combustor 16 is reduced following light-off such that the fuel flow rate is negative. As such, the computed fuel flow rate following light-off may for instance be −10 pph/sec and the limited fuel flow rate may be −5 pph/sec, causing a slower decrease in fuel flow to the engine 10. The fuel flow rate determination module 212 then generates a fuel command (also referred to as a "modified fuel command" or a "limited fuel command") to cause fuel to be provided to the combustor 16 according to the limited fuel flow rate. The fuel command generated by the fuel flow rate determination module 212 is then sent to the output module 214 for transmission (using any suitable communications means) to the fuel control unit 204.

In some embodiments, the limiting factor is predetermined and has a fixed value for a given engine configuration. The limiting factor may be determined by the engine controller 202 based on engine testing data (e.g., retrieved from memory or other suitable storage means), which provides indication of engine behaviour. The limiting factor may be determined from analysis of the testing data of an actual engine, or from a mathematical model representing the engine. For example, the optimal limited fuel flow rate to be used for the engine 10 may be determined based on empirical test data for the engine 10, by making a projection of the fuel command for the engine 10 using different fuel flow rates. In one embodiment, in order to determine the optimal limited fuel command for the engine 10, and accordingly the optimal limiting factor and corresponding optimal limited fuel flow rate, different possible fuel commands may be generated by varying the slope of the baseline fuel command curve (i.e. the fuel command as per the closed loop fuel schedule). The different possible fuel commands may then be evaluated and the optimal limited fuel command for the engine 10 will be the fuel command which reduces the fuel flow to the engine's combustor at a slower pace than if the computed fuel flow rate was to be used, while preventing fuel flow from being reduced up to or below to the minimum fuel flow limit defined by the closed loop control logic. In some embodiments, the optimal limited fuel command for the engine 10 will also be selected based on the impact that causing fuel flow according to the selected fuel command will have on operating parameters of the engine 10 and/or of the aircraft, such as engine temperature for example. The optimal limited fuel command for the engine 10 may be determined so as to avoid hazardous effects including, but not limited to, surge, stall, flameout, and over-temperature, as well as to avoid instability in any operating parameter of the engine 10. For instance, amongst the possible fuel commands evaluated, the fuel command which has the least negative impact on the engine's overall temperature (i.e. which does not increase the temperature of the engine 10) may be selected as the optimal limited fuel command for the engine 10.

In other embodiments, the value of the limiting factor may be adapted to the ambient operating conditions of the engine 10. For example, the value of the limiting factor may vary depending on the aircraft's altitude. A first limiting factor value (i.e. a first limited fuel flow rate) may be used when the engine 10 is started while the aircraft is on the ground (i.e. when an on-ground start is performed), and one or more second limiting factor values may be used (i.e. one or more second limited fuel flow rates may be obtained) when the engine 10 is started while the aircraft is airborne, depending on the aircraft's altitude. The engine 10 may be started at an altitude within the range from about −5,000 feet to about 40,000 feet or more. In one embodiment, the engine 10 is an APU that is started at high altitude (e.g., at an altitude of about 40,000 feet or more). Other embodiments may however apply and it should be understood that operating conditions other than altitude may also be taken into account in determining the value of the limiting factor.

In one embodiment, the engine controller 202 may be configured to apply a limiting factor whose value increases with increasing altitude, such that the fuel flow to the engine's combustor is reduced at a lower rate as the aircraft's altitude increase. In other words, the higher the altitude of the aircraft, the higher the limiting factor applied to the computed fuel flow rate and the lower the limited fuel flow rate. The memory accessible by the engine controller 202 may therefore store therein (in any suitable format, such as a lookup table, or the like) a plurality of values for the limiting factor (i.e. a plurality of limited fuel flow rates) as a function of altitude (and/or as a function of any other applicable operating condition(s) of the engine 10). The engine controller 202 may be configured to obtain at the input module 208 (e.g., from the measurement(s) obtained from the sensor(s) 206 of FIG. 2A) a current (or actual) value of the aircraft's altitude. The engine controller 202 may then query the memory with the current value of the altitude to determine the limiting factor. In particular, the engine controller 202 may correlate the current value of the aircraft's altitude to the data stored in memory in order to determine the appropriate limiting factor to be applied for the engine 10 at the current altitude. Other embodiments may apply.

The engine controller 202 continuously monitors the engine's operating parameter(s) in order to determine when to apply and when to cancel the limiting factor. In some embodiments, the limiting factor may be applied to the computed fuel flow rate anytime the engine controller 202 detects a large controller error which would result in a rapid decrease in fuel flow to the combustor 16 during a given start sequence for the engine 10. In other embodiments, the controller 202 may limit the number of times the limiting factor may be applied during a given start sequence. In other words, the engine controller 202 may only cause fuel to be delivered to the combustor 16 according to the limited fuel flow rate for a predetermined number of times during the given start sequence. The engine controller 202 may include a counter (implemented using any suitable means) that counts the number of times the limiting factor has been applied to the computed fuel flow rate. Once the predetermined number of times has been reached for the given start sequence, application of the limiting factor is automatically deactivated (or cancelled) and the computed fuel flow rate may no longer be limited (i.e. fuel flow to the engine 10 may only be delivered according to the computed fuel flow rate). The counter may then be reset once a new start sequence is initiated. In some embodiments, the controller 202 only applies the limiting factor once after light-off of the engine 10, when flameout occurs during start. If flameout occurs more than once, then the controller 202 may apply the limiting factor multiple times to overcome flameout.

In yet other embodiments, the controller 202 may restrict application of the limiting factor to the computed fuel flow rate for a predetermined range of values of the engine's operating parameter(s). For example, the limiting factor may only be applied when one or more operating parameters of the engine 10 are within a given range. The controller 202 may therefore be configured to compare the actual value of the operating parameter(s) to the predetermined range, which may be retrieved from memory or other suitable storage means. When the engine's operating parameter(s) are outside the given range, application of the limiting factor is automatically deactivated (or cancelled) and fuel is provided to the combustor 16 according to the computed fuel flow rate. Other embodiments may apply. It should therefore be understood that the criteria for cancelling use of the limiting factor may depend on engine configuration and/or application.

Figure 3:
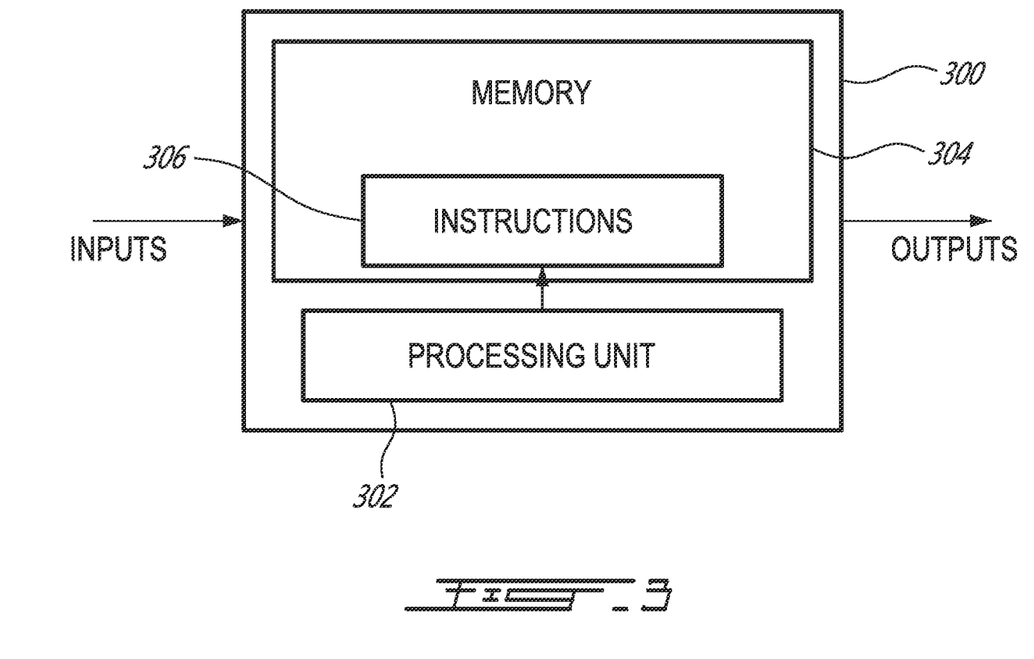
FIG. 3 is a block diagram of a computing device for implementing the system of FIG. 2, in accordance with an illustrative embodiment.

With reference to FIG. 3, an example of a computing device 300 is illustrated. For simplicity only one computing device 300 is shown but the system may include more computing devices 300 operable to exchange data. The computing devices 300 may be the same or different types of devices. The engine controller 202 of FIG. 2A and FIG. 2B may be implemented with one or more computing devices 300. Note that the engine controller 202 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 300 comprises a processing unit 302 and a memory 304 which has stored therein computer-executable instructions 306. The processing unit 302 may comprise any suitable devices configured to implement the methods described herein such that instructions 306, when executed by the computing device 300 or other programmable apparatus, may cause the functions/acts/steps performed as part of the methods as described herein to be executed. The processing unit 302 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 304 may comprise any suitable known or other machine-readable storage medium. The memory 304 may comprise non-transitory computer readable storage medium, for example, but not limited to, an electronic, magnetic, optical, electromagnetic, infrared, or semiconductor system, apparatus, or device, or any suitable combination of the foregoing. The memory 304 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may comprise any storage means (e.g., devices) suitable for retrievably storing machine-readable instructions 306 executable by processing unit 302.

Figure 4:
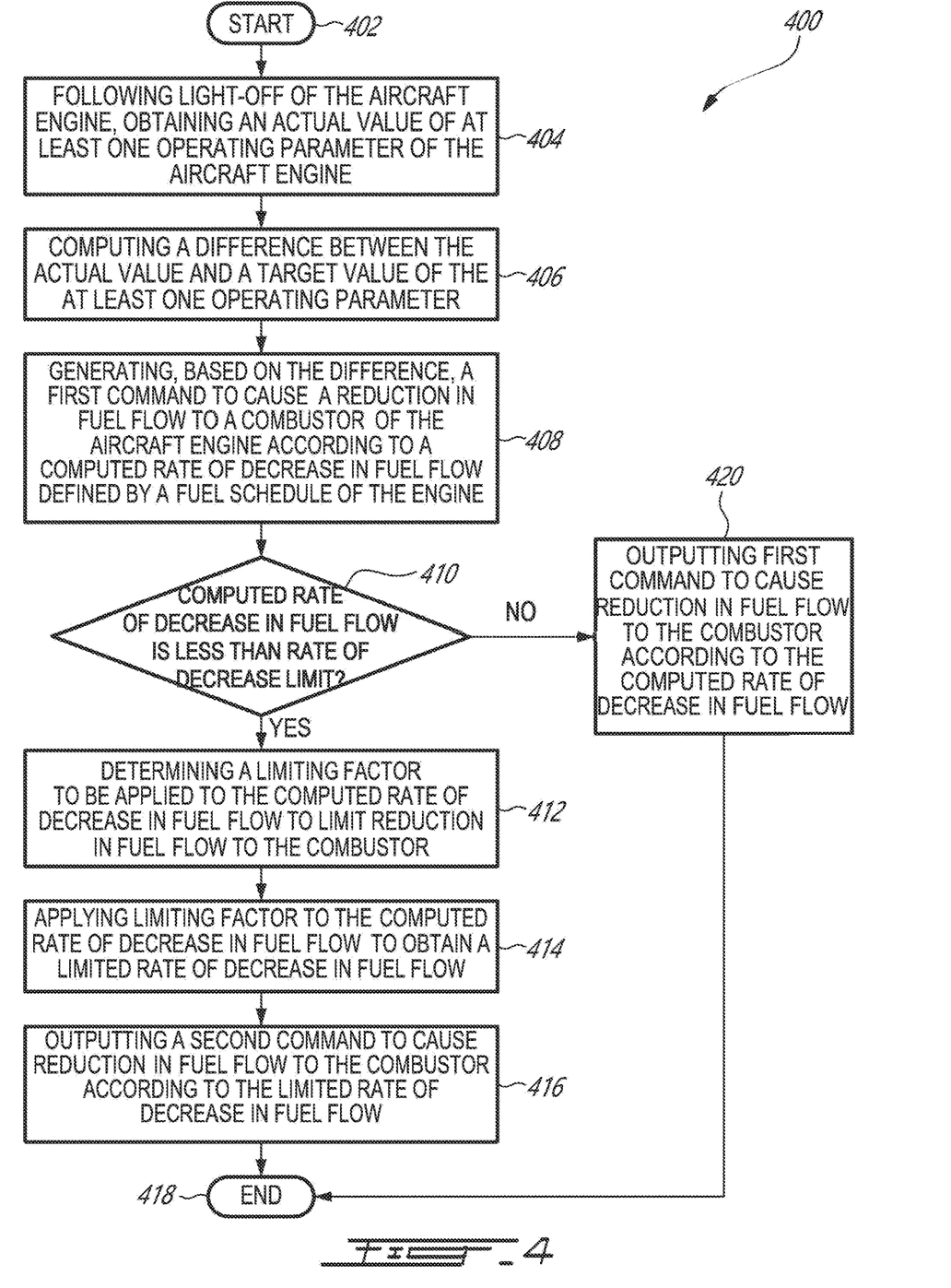
FIG. 4 is a flowchart of a method for controlling fuel flow to an aircraft engine during start, in accordance with an illustrative embodiment.

Referring now to FIG. 4, a method 400 for controlling fuel flow to an aircraft engine, such as the engine 10 of FIG. 1, during start will now be described in accordance with one embodiment. After the method is started (step 402), the next step 404 comprises obtaining, following light-off of the engine 10, an actual value of at least one operating parameter of the engine 10. In one embodiment, the operating parameter is an acceleration of the engine 10. Other embodiments may apply. The next step 404 comprises computing a difference between the actual value and a target value of the at least one operating parameter. The next step 408 comprises generating, based on the difference, a first command to cause a reduction in fuel flow to the combustor 16 of FIG. 1 according to a computed rate of decrease in fuel flow defined by a fuel schedule of the engine 10. At step 410, it is then assessed whether the computed rate of decrease in fuel flow is less than a rate of decrease limit, which may be retrieved from a memory, a database, or other suitable storage means.

When it is determined at step 410 that the computed rate of decrease in fuel flow is less than (i.e. is a larger negative number) the rate of decrease limit, the method 400 proceeds at step 412 with determining a limiting factor to be applied to the computed rate of decrease in fuel flow (defined by the closed loop fuel control logic) in order to limit the reduction in fuel flow to the combustor 16. In particular, the limiting factor is determined to prevent the fuel flow to the combustor 16 from being reduced below a minimum fuel flow limit defined by the engine's closed loop fuel schedule. The limiting factor may be determined in the manner described herein above with reference to FIG. 2B, including obtaining a current altitude of the aircraft and querying a memory with the current altitude to determine the limiting factor, the memory having stored therein a plurality of values for the limiting factor as a function of altitude. The next step 414 comprises applying the limiting factor to the computed rate of decrease in fuel flow to obtain a limited rate of decrease in fuel flow. As previously discussed, the limited rate of decrease in fuel flow is slower than the computed rate of decrease in fuel flow. The next step 416 then comprises outputting a second command to cause the reduction in fuel flow to the combustor 16 according to the limited rate of decrease in fuel flow. In one embodiment, the second command is output to the fuel control unit 204 of FIG. 2A. The method may then end at step 418.

When it is determined at step 410 that the computed rate of decrease in fuel flow is not less than (i.e. is greater or equal to) the rate of decrease limit, the method 400 may proceed to the step 420 of outputting the first command to cause the reduction in fuel flow to the combustor 16 according to the computed rate of decrease in fuel flow defined by the closed loop fuel schedule. The method may then end at step 418.

Figure 5:
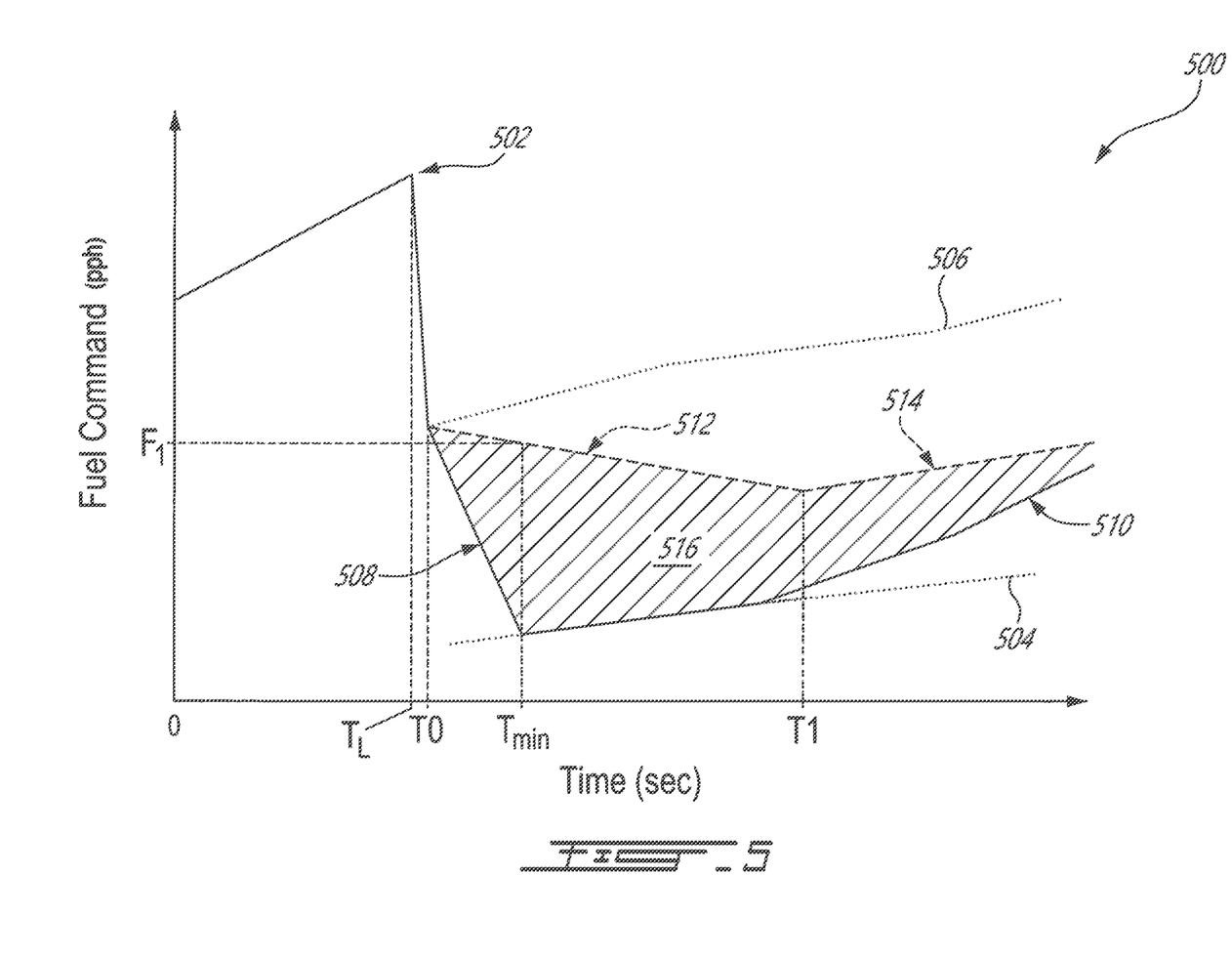
FIG. 5 is a plot of fuel command for the engine of FIG. 1, in accordance with an illustrative embodiment.

FIG. 5 illustrates a plot 500 of fuel command over time (in seconds) for an aircraft engine, such as the engine 10 of FIG. 1. As illustrated in FIG. 5, the first phase of the engine starting process (i.e. the phase leading to light-off) lasts from 0 seconds to time $T_L$. As described herein above, this first phase follows an open loop fuel flow profile in which fuel flow is commanded (i.e. increased) based, for example, on a desired rotational speed of the compressor section (reference 14 in FIG. 1) of the engine 10. At time $T_L$, light-off of the engine 10 is detected, as indicated by arrow 502. Following light-off, fuel flow is commanded based on a closed loop fuel schedule which is between a minimum fuel flow limit 504 (to prevent flameout and poor fuel atomization after light-off) and a maximum fuel flow limit 506 (to prevent excessive turbine inlet temperatures and surge in the engine 10 after light-off). The fuel schedule and the minimum and maximum fuel flow limits are determined during the development of the engine 10 (e.g., in the laboratory) and therefore vary depending on engine configuration. As described herein above, light-off results in a reduction in the fuel command to the engine's combustor (reference 16 in FIG. 1).

In the embodiment illustrated in FIG. 5, the controller 202 detects at time $T_0$ that the error between the actual value and the target value of the engine's operating parameter(s) exceeds the predetermined threshold. For instance, it is detected that the engine 10 is accelerating faster than a target acceleration value. If fuel flow to the combustor 16 was to be controlled as per the closed loop fuel schedule (i.e. with no limiting factor applied to control the decrease in fuel flow to the engine 10), the fuel command 508 would rapidly decrease and fuel flow would be delivered to the combustor 16 according to the computed fuel flow rate starting at time $T_0$. The minimum fuel flow limit 504 would be reached at time $T_{min}$. Following $T_{min}$, the engine 10 would begin to stabilize and the error between the actual value and the target value of the engine's operating parameter(s) would be brought within the threshold, within a predetermined tolerance (e.g., the engine's acceleration would follow the target acceleration value). This would result in an increased fuel command 510 being output, with the fuel flow to the combustor 16 being increased at the computed fuel flow rate defined by the closed loop fuel schedule.

As previously noted, the systems and methods described herein are used to limit (i.e. slow down) the rapid decrease in fuel flow following light-off, in order to prevent fuel flow from being reduced to or below the minimum fuel flow limit 504. For this purpose, following light-off (i.e., following $T_L$), it is proposed herein to apply a limiting factor to the computed fuel flow rate when the computed fuel flow rate is less than the fuel flow rate limit. FIG. 5 illustrates the fuel command 512 that is output (e.g., by the engine controller 202) starting at time $T_0$ to cause fuel to be provided to the combustor 16 according to the limited fuel flow rate. As previously noted, the limited fuel flow rate is greater than the computed fuel flow rate defined by the closed loop control logic, as evidenced by the fact that the negative slope (i.e. the rate of decrease) of the fuel command 508 is steeper than the slope of fuel command 512 (A steeper negative slope of the computed flow rate implies a larger negative number, which is less than the limited fuel flow rate). In particular, the minimum fuel flow limit 504 is not reached when the limiting factor is applied and fuel is provided to the combustor 16 according to the limited fuel flow rate. Instead, a fuel flow value F1 higher than the minimum fuel flow limit 504 is reached at time $T_{min}$.

As previously noted, the engine controller 202 continuously monitors the engine's operating parameter(s) (e.g., acceleration) in order to determine when to apply and when to cancel the limiting factor (i.e. when to activate and deactivate the fuel flow rate limiting functionality). In this manner, the engine controller 202 may only apply the limiting factor to the computed fuel flow rate when required. In one embodiment, the limiting factor is automatically cancelled when the computed fuel flow rate is within (i.e. below or equal to) the fuel flow rate limit, within a predetermined tolerance. In the embodiment of FIG. 5, this occurs at time $T_1$ where an increased fuel command 514 is output. It can be seen that, following cancellation of the limiting factor, fuel flow to the combustor 16 is increased at a slower rate than would be the case if the closed loop schedule was to be followed. This is evidenced by the fact that the slope (i.e. the rate of increase) of the fuel command 510 is steeper than the slope of the fuel command 514. The slower increase following cancellation of the limiting factor is due to the fact that application of the limiting factor at time $T_0$ resulted in the fuel flow to the combustor 16 being decreased at a lower rate, such that the fuel flow need only be increased at a lower rate when the limiting factor is cancelled.

The hashed area 516 in FIG. 5 indicates the difference between the fuel command generated following the closed loop control logic and the fuel command generated using the systems and methods proposed herein (i.e. using the limiting factor). It can therefore be seen that, in one embodiment, the proposed systems and methods for controlling fuel flow to an aircraft engine during start may allow for more optimized fuel flow to the combustor 16. Successful (i.e., stable) engine start may also be achieved.

In one embodiment, using the systems and methods proposed herein may also allow to avoid engine flameout conditions without the need to modify the engine's acceleration schedule or fuel schedule.

The methods and systems for controlling fuel flow to an aircraft engine during start described herein may be implemented in a high level procedural or object oriented programming or scripting language, or a combination thereof, to communicate with or assist in the operation of a computer system, for example the computing device 300. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 302 of the computing device 300, to operate in a specific and pre-defined manner to perform the functions described herein, for example those described in the methods described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for controlling fuel flow to an aircraft engine during start, the method comprising:
    following a light-off of the aircraft engine, obtaining an actual value of at least one operating parameter of the aircraft engine;
    computing a difference between the actual value of the at least one operating parameter and a target value of the at least one operational parameter;
    generating, based on the difference, a first command to cause a reduction in fuel flow to a combustor of the aircraft engine according to a computed rate of decrease in fuel flow, the computed rate of decrease in fuel flow defined by a fuel schedule of the aircraft engine;
    comparing the computed rate of decrease in fuel flow to a rate of decrease limit;
    after the computed rate of decrease in fuel flow is less than the rate of decrease limit, modifying the first command by:
    determining a limiting factor to be applied to the computed rate of decrease in fuel flow to limit then reduction in fuel flow to the combustor following the light-off of the aircraft engine,
    applying the limiting factor to the computed rate of decrease in fuel flow to obtain a limited rate of decrease in fuel flow, the limited rate of decrease in fuel flow slower than the computed rate of decrease in fuel flow and
    outputting a second command to cause the reduction in fuel flow to the combustor according to the limited rate of decrease in fuel flow.

2. The method of claim 1, wherein the limiting factor is determined to prevent fuel flow to the combustor from decreasing to or below a minimum fuel flow limit following the light-off of the aircraft engine, the minimum fuel flow limit defined by the fuel schedule.

3. The method of claim 1, wherein the at least one operating parameter of the aircraft engine is an acceleration of the aircraft engine.

4. The method of claim 1, wherein the second command is output to a fuel control unit of the aircraft engine.

5. The method of claim 1, wherein the second command is output during an on-ground start or an in-flight start of the aircraft engine.

6. The method of claim 5, wherein the aircraft engine is an Auxiliary Power Unit (APU) started at an altitude ranging from about −5,000 feet to about 40,000 feet or more.

7. The method of claim 5, further comprising obtaining a current altitude of an aircraft the aircraft engine is provided on and querying a memory with the current altitude to determine the limiting factor, the memory having stored therein a plurality of values for the limiting factor as a function of altitude.

8. The method of claim 1, wherein the determining the limiting factor comprises retrieving a value for the limiting factor from a memory, the value for the limiting factor set based on testing data for the aircraft engine.

9. The method of claim 1, further comprising comparing the actual value of the at least one operating parameter to a predetermined range of values, and applying the limiting factor when the actual value is within the range of values.

10. The method of claim 1, further comprising limiting a number of times the applying the limiting factor is performed during start of the aircraft engine.

11. A system for controlling fuel flow to an aircraft engine during start, the system comprising:
    at least one processing unit; and at least one non-transitory computer-readable memory having stored thereon program instructions executable by the at least one processing unit for:
    following a light-off of the aircraft engine, obtaining an actual value of at least one operating parameter of the aircraft engine;
    computing a difference between the actual value of the at least one operating parameter and a target value of the at least one operational parameter;
    generating, based on the difference, a first command to cause a reduction in fuel flow to a combustor of the aircraft engine according to a computed rate of decrease in fuel flow, the computed rate of decrease in fuel flow defined by a fuel schedule of the aircraft engine;
    comparing the computed rate of decrease in fuel flow to a rate of decrease limit;
    when the computed rate of decrease in fuel flow is less than the rate of decrease limit, determining a limiting factor to be applied to the computed rate of decrease in fuel flow to limit the reduction in fuel flow to the combustor following the light-off of the aircraft engine,
    applying the limiting factor to the computed rate of decrease in fuel flow to obtain a limited rate of decrease in fuel flow, the limited rate of decrease in fuel flow slower than the computed rate of decrease in fuel flow, and
    outputting a second command to cause the reduction in fuel flow to the combustor according to the limited rate of decrease in fuel flow; and
    when the computed rate of decrease in fuel flow is within the rate of decrease limit, outputting the first command.

12. The system of claim 11, wherein the program instructions are executable by the at least one processing unit for determining the limiting factor to prevent fuel flow to the combustor from decreasing to or below a minimum fuel flow limit following the light-off of the aircraft engine, the minimum fuel flow limit defined by the fuel schedule.

13. The system of claim 11, wherein the at least one operating parameter of the aircraft engine is an acceleration of the aircraft engine.

14. The system of claim 11, wherein the program instructions are executable by the at least one processing unit for outputting the first command and the second command to a fuel control unit of the aircraft engine.

15. The system of claim 11, wherein the program instructions are executable by the at least one processing unit for outputting the first command and the second command during an on-ground start or an in-flight start of the aircraft engine.

16. The system of claim 15, wherein the aircraft engine is an Auxiliary Power Unit (APU) started at an altitude ranging from about −5,000 feet to about 40,000 feet or more.

17. The system of claim 15, wherein the program instructions are executable by the at least one processing unit for obtaining a current altitude of an aircraft the aircraft engine is provided on and querying a memory with the current altitude to determine the limiting factor, the memory having stored therein a plurality of values for the limiting factor as a function of altitude.

18. The system of claim 11, wherein the program instructions are executable by the at least one processing unit for retrieving a value for the limiting factor from a memory, the value for the limiting factor set based on testing data for the aircraft engine.

19. The system of claim 11, wherein the program instructions are executable by the at least one processing unit for comparing the actual value of the at least one operating parameter to a predetermined range of values, and applying the limiting factor when the actual value is within the range of values.

20. The system of claim 11, wherein the program instructions are executable by the at least one processing unit for limiting a number of times the applying the limiting factor is performed during start of the aircraft engine.

* * * * *